United States Patent
Skov et al.

(10) Patent No.: US 8,554,255 B2
(45) Date of Patent: Oct. 8, 2013

(54) METHOD AND APPARATUS FOR PROVIDING POWER CONTROL OF A WIRELESS TERMINAL

(75) Inventors: Peter Skov, Beijing (CN); Chun Ye Wang, Beijing (CN); Xiao Yi Wang, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 406 days.

(21) Appl. No.: 12/990,374

(22) PCT Filed: Apr. 29, 2008

(86) PCT No.: PCT/IB2008/001045
§ 371 (c)(1),
(2), (4) Date: Oct. 29, 2010

(87) PCT Pub. No.: WO2009/133420
PCT Pub. Date: Nov. 5, 2009

(65) Prior Publication Data
US 2011/0039589 A1    Feb. 17, 2011

(51) Int. Cl.
*H04B 7/00* (2006.01)
(52) U.S. Cl.
USPC .......... 455/501; 455/522; 455/69; 455/127.1; 455/67.11; 455/509; 370/310; 370/328; 370/329; 370/343; 370/345

(58) Field of Classification Search
USPC .................. 455/501, 522, 69, 68, 127.1, 509, 455/67.11, 517, 500, 507, 445, 506, 515, 455/426.1, 426.2, 422.1, 403, 550.1, 67.13; 370/310, 328, 329, 343, 345
See application file for complete search history.

(56) References Cited

U.S. PATENT DOCUMENTS

| | | | |
|---|---|---|---|
| 2002/0160803 A1* | 10/2002 | Ishikawa | 455/522 |
| 2002/0168994 A1 | 11/2002 | Terry et al. | |
| 2006/0019694 A1 | 1/2006 | Sutivong et al. | |
| 2007/0129094 A1 | 6/2007 | Jeong et al. | |
| 2008/0081655 A1* | 4/2008 | Shin et al. | 455/522 |

FOREIGN PATENT DOCUMENTS

WO   WO 2009/133420 A1   11/2009

OTHER PUBLICATIONS

International preliminary report on patentability for corresponding international application No. PCT/IB2008/001045 dated Nov. 2, 2010, pp. 1-7.
International search report and written opinion for corresponding international application No. PCT/IB2008/001045 dated Jan. 13, 2009, pp. 1-8.

* cited by examiner

*Primary Examiner* — Keith Ferguson
(74) *Attorney, Agent, or Firm* — Ditthavong Mori & Steiner, P.C.

(57) ABSTRACT

An approach is provided for power control. The sum of path gain relating to non-serving sectors is determined. Power spectrum density (PSD) is determined according to a power control scheme. A power level is set based on the power spectrum density (PSD).

20 Claims, 13 Drawing Sheets

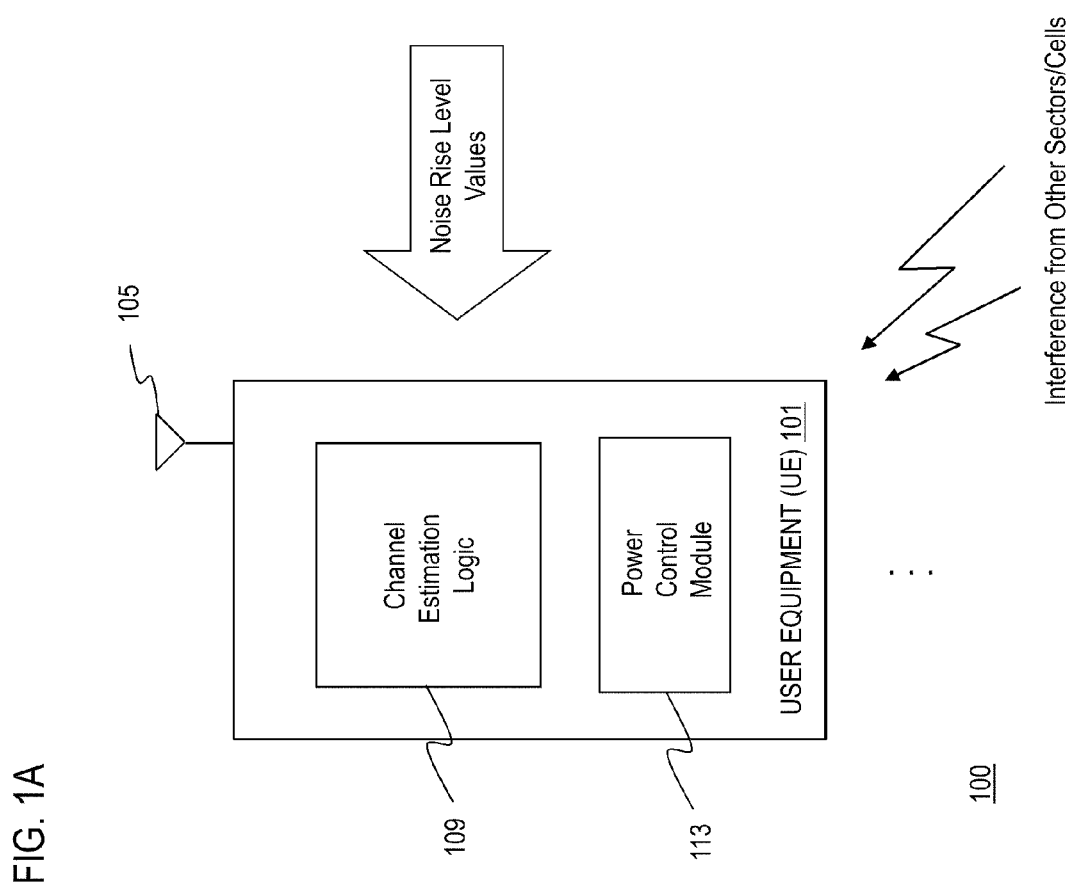

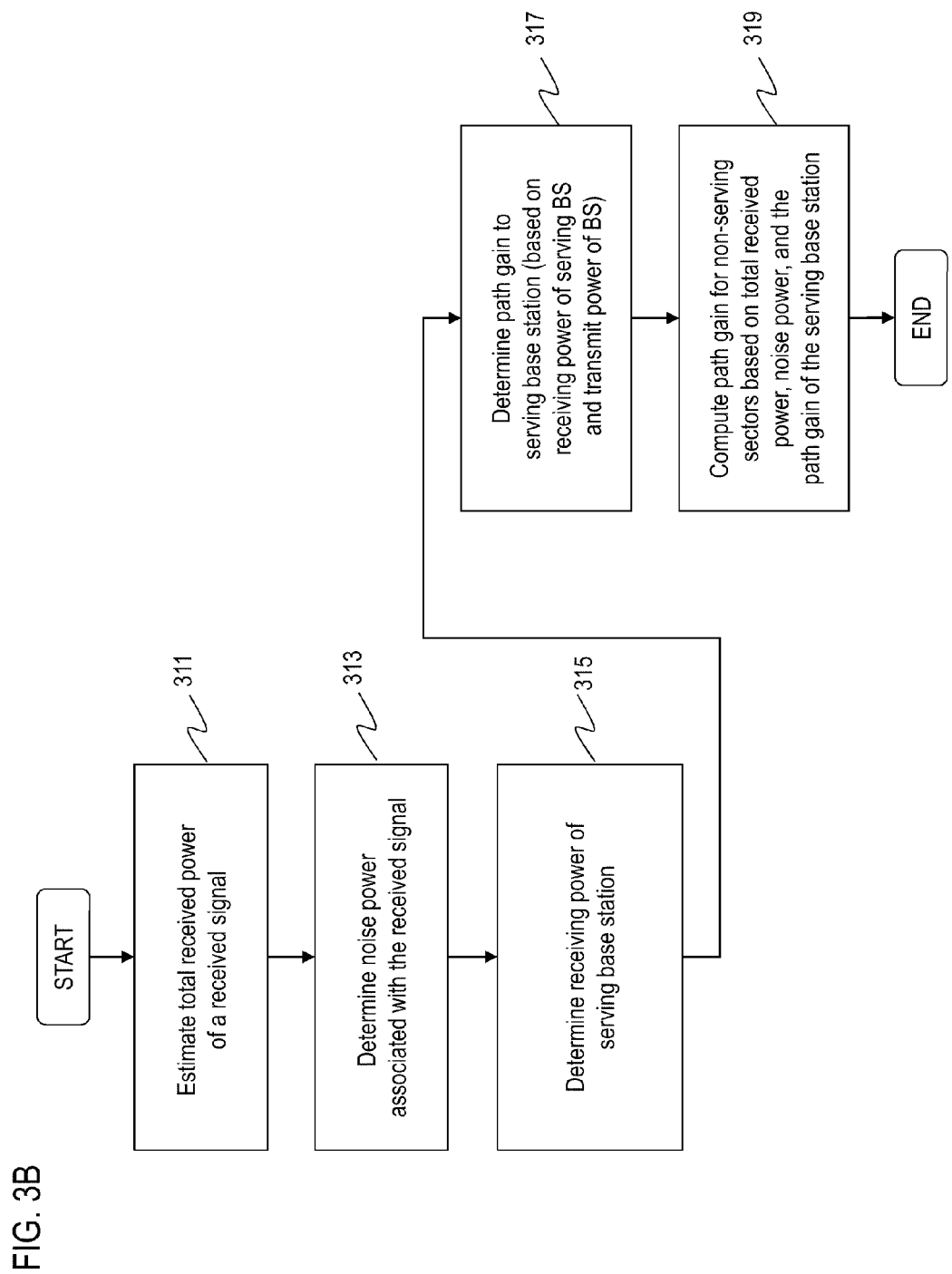

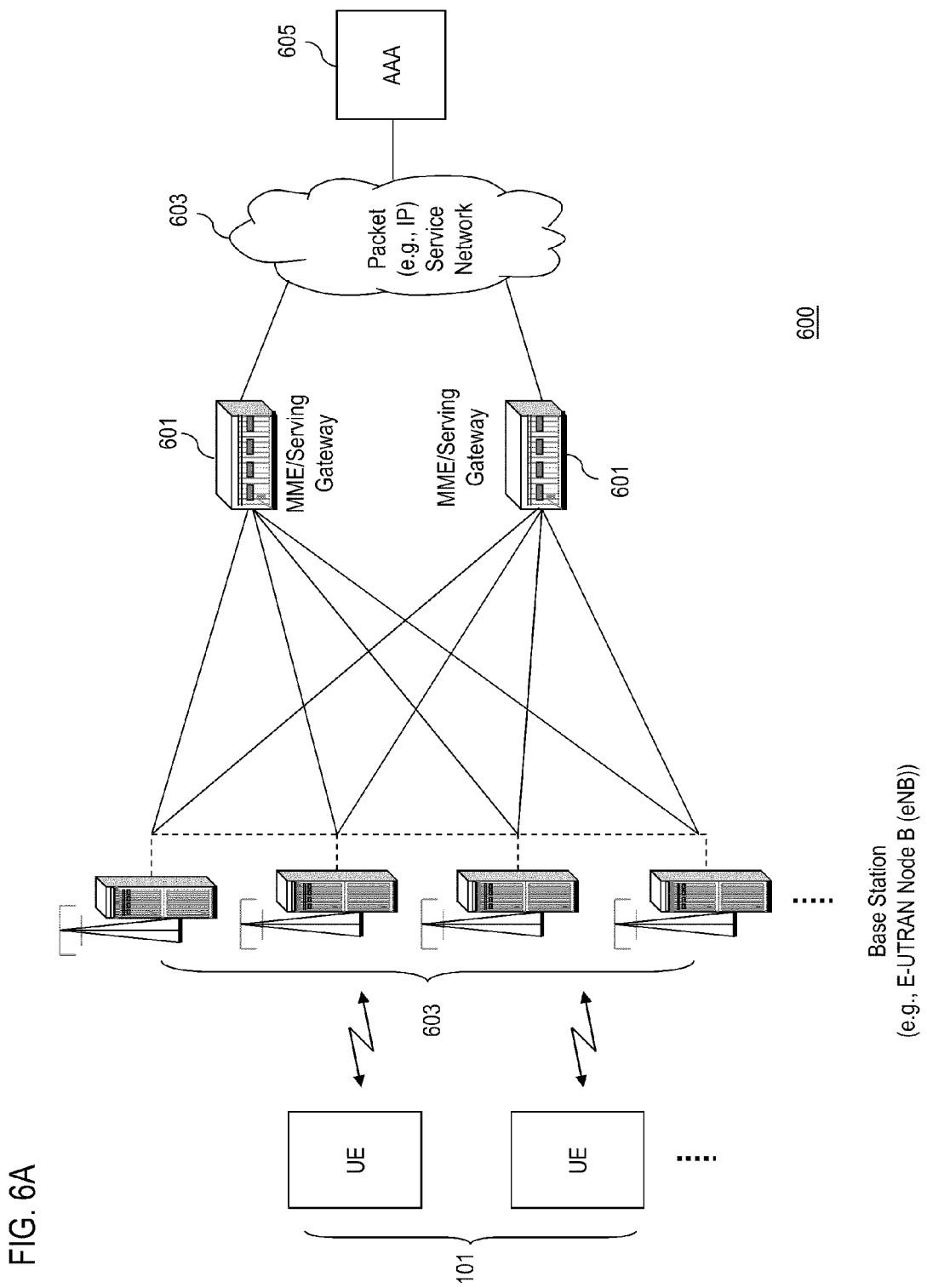

METHOD AND APPARATUS FOR PROVIDING POWER CONTROL OF A WIRELESS TERMINAL

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves optimizing transmission of data in a manner that accounts for conservation of system resources—e.g., bandwidth, and power of the terminal.

Cellular service providers, for example, continue to develop more enhanced network services and applications. Consequently, manufacturers of mobile devices (e.g., cellular phones) are challenged to continually add greater and greater functional capabilities in smaller and smaller form factors. For instance, beyond the already advanced telephony and data capabilities, these devices can include other sophisticated functions and applications, such as digital camera functionality and gaming applications. The goals of greater functionalities with reduced form factor are at odds with the design of the power system of the mobile devices, in that generally more functions require more battery consumption. However, consumers expect more capability as well as identical, or even longer, operation of the phones, thereby providing longer talk-time, etc. Therefore, to be competitive, the manufacturers need to address the ever growing requirement for longer battery life.

SOME EXEMPLARY EMBODIMENTS

Therefore, there is a need for an approach to provide efficient, accurate power control of a wireless terminal.

According to one embodiment of the invention, a method comprises receiving target noise rise level values. The method also comprises determining sum of path gain to non-serving sectors. The method also comprises computing a power spectrum density (PSD) based on the target noise rise level values, the sum of path gain, and level of thermal noise power. The method further comprises setting a power level based on the computed power spectrum density.

According to another embodiment of the invention, an apparatus comprises a power control module configured to receive target noise rise level values, and to determine sum of path gain to non-serving sectors. The power control module is further configured to compute a power spectrum density (PSD) based on the target noise rise level values, the sum of path gain, and level of thermal noise power. The power control module is further configured to set a power level based on the computed power spectrum density.

According to another embodiment of the invention, a method comprises generating target noise rise level values for transmission to a terminal for adjustment of power level. The power level is adjusted by computing a power spectrum density (PSD) of the terminal based on the target noise rise level values, a sum of path gain to non-serving sectors, and level of thermal noise power.

According to another embodiment of the invention, an apparatus comprises a power control module configured to generate target noise rise level values for transmission to a terminal for adjustment of power level. The power level is adjusted by computing a power spectrum density (PSD) of the terminal based on the target noise rise level values, a sum of path gain to non-serving sectors, and level of thermal noise power.

According to another embodiment of the invention, a method comprises determining sum of path gain to all non-serving sectors, and inputting the determined sum of path gain into a power control scheme to output a power spectral density (PSD). The method further comprises setting a power level based on the power spectral density.

According to yet another embodiment of the invention, an apparatus comprises means for determining sum of path gain relating to all non-serving sectors, and means for inputting the determined sum of path gain into a power control scheme to output a power spectral density (PSD). Further, the apparatus comprises means for setting a power level based on the power spectral density.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 1A and 1B are diagrams of a communication system capable of providing interference constraint power control, according to an embodiment of the invention;

FIGS. 3A and 3B are flowcharts of processes for controlling transmission power based on cell path gain of non-serving sectors, according to various embodiments of the invention;

FIGS. 6A-6D are diagrams of communication systems having exemplary long-term evolution (LTE) and E-UTRA (Evolved Universal Terrestrial Radio Access) architectures, in which the system of FIG. 1 can operate, according to various exemplary embodiments of the invention;

DESCRIPTION OF PREFERRED EMBODIMENTS

An apparatus, method, and software for providing power control of a wireless terminal are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to interference constraint power control using a WiMAX (Worldwide Interoperability for Microwave Access) technology, it is recognized by one of ordinary skill in the art that the embodiments of the inventions have applicability to any type of communication systems (e.g., a Third Generation Partnership Project (3GPP) Long Term Evolution (LTE)) and equivalent technologies.

Figure 1B:
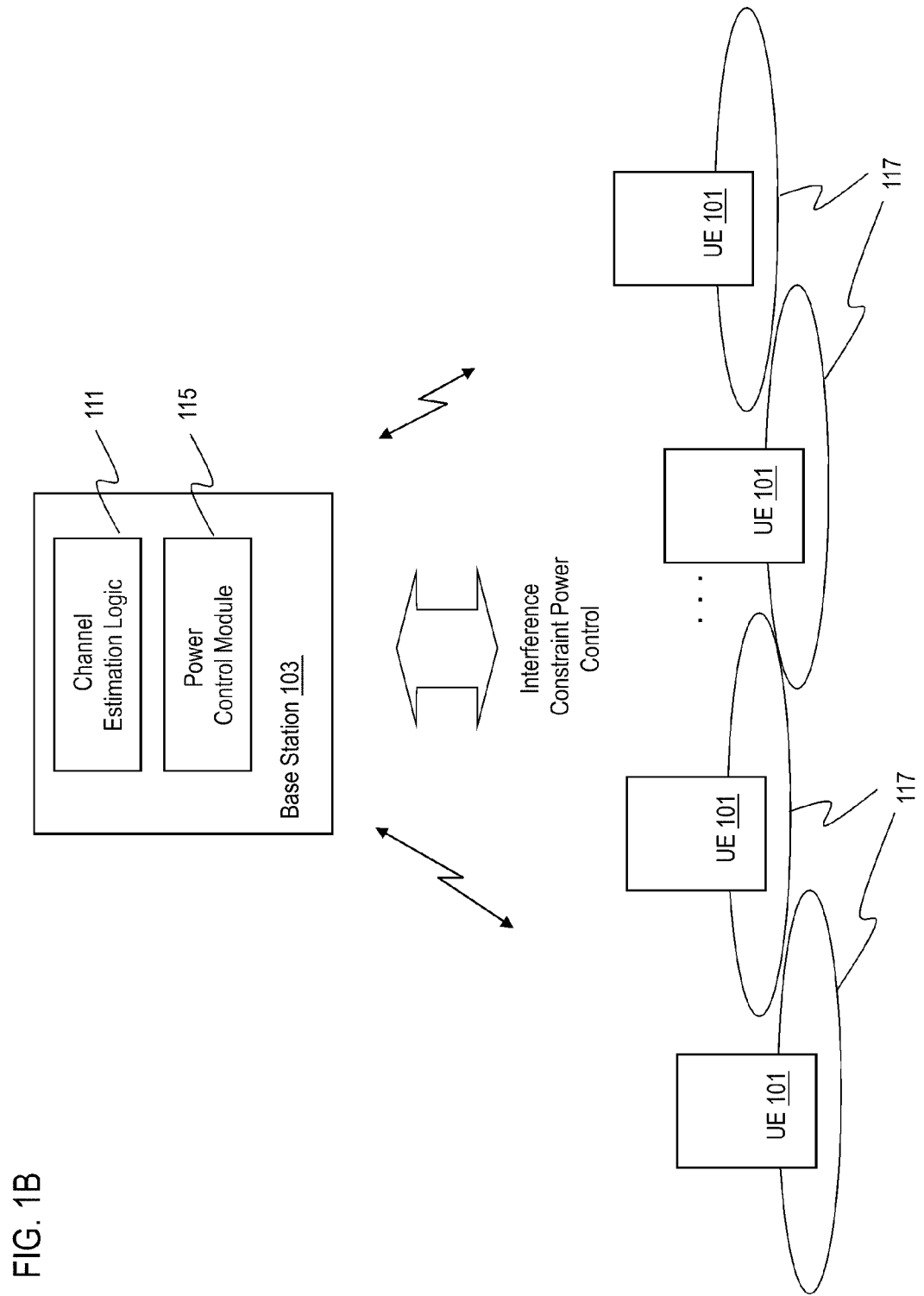

FIGS. 1A and 1B are diagrams of a communication system capable of providing interference constraint power control, according to an embodiment of the invention. As shown in FIG. 1A, one or more user equipment (UEs) 101 communicate with a network equipment, such as a base station 103, which is part of an access network (e.g., WiMAX (Worldwide Interoperability for Microwave Access), 3GPP LTE (or E-UTRAN or 3.9G), etc.). According to one embodiment, the base station 103 is part of an access network (e.g., 3GPP LTE (or E-UTRAN or 3.9G), WiMAX (Worldwide Interoperability for Microwave Access), etc.); such an access network is further detailed in FIGS. 7A and 7B. Under the 3GPP LTE architecture (as shown in FIGS. 9A-9D), base station 103 is denoted as an enhanced Node B (eNB). The UE 101 can be any type of mobile stations, such as handsets, terminals, stations, units, devices, or any type of interface to the user (such as "wearable" circuitry, etc.). The UE 101 includes a transceiver (not shown) and an antenna system 105 that couples to the transceiver to receive or transmit signals from the base station 103; the antenna system 105 can include one or more antennas.

As with the UE 101, the base station 103 employs a transceiver (not shown), which transmits information to the UE 101. Also, the base station 103 can employ one or more antennas 107 for transmitting and receiving electromagnetic signals. For instance, the Node B 103 may utilize a Multiple Input Multiple Output (MIMO) antenna system 107, whereby the Node B 103 can support multiple antenna transmit and receive capabilities. This arrangement can support the parallel transmission of independent data streams to achieve high data rates between the UE 101 and Node B 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GPP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

In the OFDM wireless communication system 100, such as IEEE (Institute of Electrical & Electronics Engineers) 802.16 m, uplink power control is of critical importance to the overall system performance and battery life of mobile stations 101. On the uplink direction, multiple orthogonal resources units are defined in the frequency domain based on OFDMA in 802.16 m. They can be allocated to multiple users at one time with each user being allocated one or more resource blocks. For example, the allocated resources involve physical resource blocks (PRB), which correspond to OFDM symbols, to provide communication between the UE 101 and the base station 103. That is, the OFDM symbols are organized into a number of physical resource blocks (PRB) that includes consecutive sub-carriers for corresponding consecutive OFDM symbols. To indicate which physical resource blocks (or sub-carrier) are allocated to a UE 101, two exemplary schemes include: (1) bit mapping, and (2) (start, length) by using several bits indicating the start and the length of an allocation block.

To realize the potential performances of OFDM technique by the system 100, a highly accurate channel estimator is needed to eliminate interfering signals. As shown, the UE 101 and the base station 103 include channel estimation logic 109 and 111, respectively, for generating channel estimates. These channel estimates, in part, are supplied to corresponding power control modules 113 and 115 for control transmission power of the UE 101. The OFDM system 100 can support high speed data while maintaining high signal quality even under severe multi-path fading environments.

To maximize the spectral efficiency, frequency reuse factor of one is utilized, according to certain embodiments, for both downlink and uplink. With frequency reuse factor of one, data and control channels in one sector will experience interference from other sectors/cells. Accordingly, mobile station transmit power needs to be controlled, as to compensate for path loss without generating unacceptable interference to neighboring sectors/cells. As used herein, path loss refers to propagation loss associated with the radio transmission. Conversely, path gain can be defined as 1/path loss or (path gain =−path loss dB).

Power control (e.g., uplink power) aims to optimize UE transmit power according to the following criteria: maximum throughput, limited interference (increase throughput for other UE's), and maximum battery lifetime. The conventional approach focuses on the UE's throughput as the optimization criteria. In this case, the UE should transmit with maximum power except when its signal to interference ratio (SINR) is beyond the required SINR for the maximum modulation and coding scheme (MCS); in other words, there is no need to waste power when no further throughput can be obtained. As the SINR depends on the interference level and path loss to the serving base station, the UE transmit power can be expressed as follows:

$$P = SINR_{Target} + IoT + PL + \text{Noise},$$

where P is UE transmit power in dBm, PL is path loss to serving sector in dB, Noise is thermal noise in dBm, and IoT interference rise over thermal noise in dB. Path-loss can be defined to include: (i) distance-dependent path loss, (ii) shadow fading, (iii) antenna gains, and (iv) penetration loss—exclusive of fast fading.

In network scenarios with high site density, the uplink sector throughput is limited by the rise of interference, and not by the UE transmit power. To limit UE transmit power, one approach is to only compensate for a fraction of the path loss (fractional power control in LTE). With this mechanism, unfortunately a number of UE's with intermediate path loss may not receive sufficient transmit power.

The fractional power control algorithm involves trading off the throughput of the particular UE and that of the other UEs. However, the extent to which one can increase transmit power without penalizing other users is not explicitly taken into account. If the UE could also estimate path loss to all interfering entities, an estimate of how much interference in other sectors or cell in total can be determined. When UE transmit power increases, the interference also increases—but due to the background noise floor, the effect on SINR of a transmit power increase depends on the absolute path loss to the base station being interfered.

For example, examining two UEs transmitting in the same time frequency resource but connected to different cells, their SINRs can be characterized in the following way:

$$SINR_{ue1} = \frac{L_{ue1,sector1} \times P_{ue1}}{L_{ue2,sector1} \times P_{ue2} + N}, SINR_{ue2} = \frac{L_{ue2,sector2} \times P_{ue2}}{L_{ue1,sector2} \times P_{ue1} + N}$$

It is assumed that the two UEs are placed at the sector border where they have similar path loss to the serving sector and interfering sector:

$$L = L_{ue2,sector1} = L_{ue1,sector1} = L_{ue2,sector2} = L_{ue1,sector2},$$
$$P = P_{ue1} = P_{ue2}$$

NS Consequently, the equation for the SINR for the two UEs can be written as follows:

$$SINR = \frac{1}{1 + N/(L \times P)}$$

From this, it is deduced that when the received power at the base station is of the order of noise level the SINR is around −3 dB and at infinite transmit power its 0 dB. Thus, very limited gain can be achieved from increasing transmit power; increasing transmit power only benefits SINR when coupling to other users is weak.

It is noted there is an optimal interference level in the sense that increasing interference beyond this level will not improve cell throughput, but will only shift the bit rate distribution with a penalty to cell edge users. Taking this observation into account, power control can target a certain interference level to all interfered cells rather than target of SINR of the serving cell.

In one approach, the mobile stations estimates the received power of the downlink (DL) preamble from serving sector and with knowledge of the BS transmit power level can then estimate path loss (including shadowing and antenna gains) referred to herein as PL between the serving sector and mobile station. The transmit power per subcarrier is obtained by:

$$PSD = SINR_T + IoT + \text{Noise} + \alpha \cdot PL,$$

where SINR is the target SINR of uplink (UL) signal, IoT is the interference rise over thermal levels, and Noise is the thermal noise per subcarrier, α is the path loss compensation factor designated by BS. When α<1 only a fraction of the path loss, PL, is compensated. This is the so-called "fractional power control."

The above power control mechanism has a number of drawbacks. The level of interference that the UE creates in other cells is not taken into account. UEs with similar path gain can have very different strength as interference sources for other sectors, which depends on the path loss to surrounding sectors. Also, there is no control of the noise rise at the base station.

As an improvement over the fractional approach, an enhanced fractional power scheme can be expressed is as follows:

$$PSD = SINR_T + IoT + \text{Noise} + \alpha \cdot PL_{servingsector} + (1-\alpha) \cdot PL_{secondstrongestsector}, \text{ or}$$

$$PSD = SINR_T + IoT + \text{Noise} - \alpha \cdot g_{servingsector} - (1-\alpha) \cdot g_{secondstrongestsector},$$

where $PL_{servingsector}$ is path loss between serving sector and MS; $PL_{secondstrongestsector}$ is path loss between the second strongest sector and MS; $g_{servingsector}$ is the path gain to the serving sector; $g_{secondstrongestsector}$ is the path gain to the second strongest sector. It is noted that g=−PL, thus $g_{secondstrongestsector} = -PL_{secondstrongestsector}$.

However, this approach focuses on using path gain to the second strongest sector (in which the serving sector is the strongest) as a value to effect transmitting power. The use of the second strongest path-gain is not ideal for the following reasons. First, the second strongest path gain may be very weak. That is, there might not be dominant path gain to the non-serving sectors. Fast fading also makes the second strongest path gain obscure. Further, obtaining the second strongest path gain is a complex, time-consuming process. The mobile station has to obtain the received signal strength (e.g., using the preamble) of all neighboring sectors/cells, sort them, and then determine the second strongest path gain.

In view of the above discussion about the shortcomings of traditional power control approaches, it is recognized that power control should target interference level rather than SINR. A sum path gain approach is introduced. The sum of path gain (as more fully described below) can be utilized for power control to replace the second strongest path gain, such that power control can based on interference considerations.

As seen in FIG. 1B, the UEs 101 are served by different cells and/or sectors 117. A particular UE 101 can experience interference from a variety of sources; hence, concentrating signal strength from the serving sector can be inadequate. Consequently, the UEs 101 can employ their respective power control (or adjustment) modules 113 to determine interference levels of non-serving sectors. This information can then be utilized to set the proper transmission power level.

Figure 2:
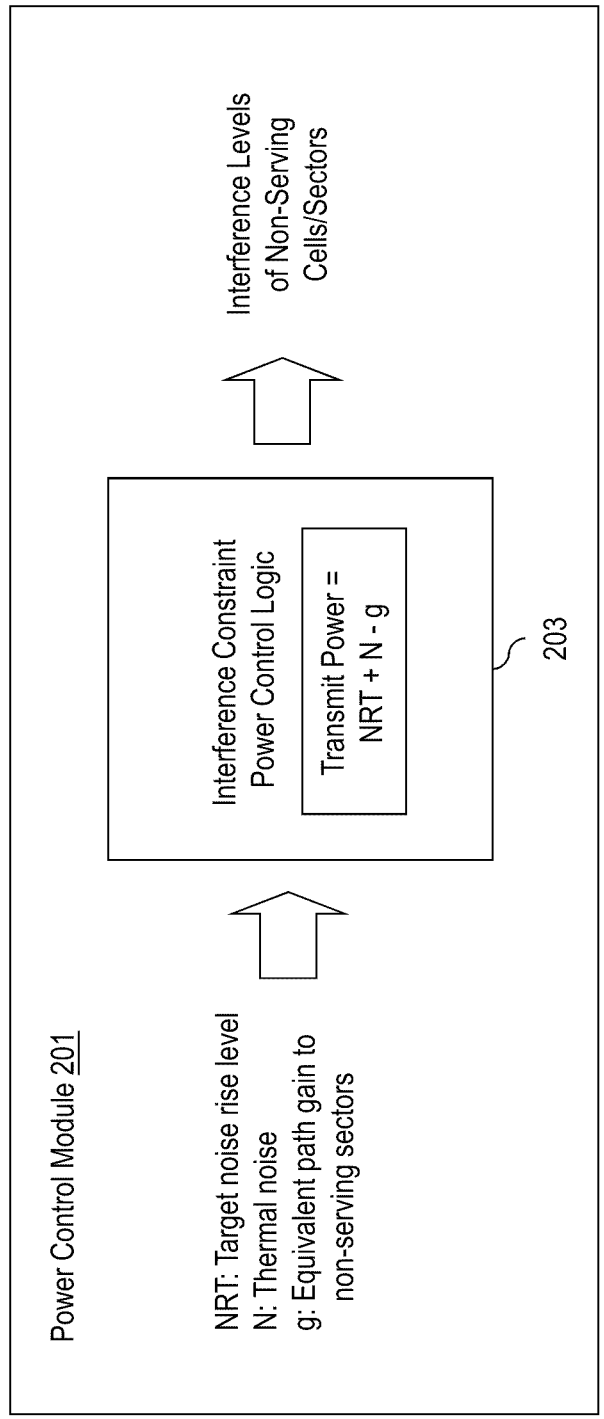
FIG. 2 is a diagram of a power control module utilized in the system of FIGS. 1A and 1B for providing power control, according to an embodiment of the invention.

FIG. 2 is a diagram of a power control module utilized in the system of FIGS. 1A and 1B for providing power control, according to an embodiment of the invention. To account for interference of sectors other than the serving sector, power control module 201 includes an interference constraint power control (ICPC) logic 203 to employ a power control scheme that targets a certain interference level to other sectors instead of targeting a certain SINR. According to one embodiment, to estimate the interference level for a given transmit power, the sum of path gain to all other sector is used. To enable adjustment of the user throughput distribution in a cell, the noise rise target could be varied for different bit rates. In that way, users with low bit rate would be allowed to target for a higher interference level.

As shown, the interference constraint power control logic 203 computes the transmit power, i.e., Power Spectrum Density(PSD), as follows:

$$PSD = NRT + \text{Noise} - g,$$

where PSD is the transmit power density (transmit power per subcarrier), Noise is the thermal noise power, g is the sum of path gain (including antenna gain and shadow fading) to all other sectors, and NRT is the target noise rise level designated by BS 103. It is noted that the values are in decibels (dB). As earlier defined, path gain is 1/path loss or (path gain =−path loss dB), wherein path loss is propagation loss.

In contrast to the convention approach, g can be obtained in the following manner:

$$g = (P-N)/Txp - PG,$$

where g is the sum of path gain to other sectors, P is the total received power (preamble), N is the noise power, Txp is the transmitting power of BS, and PG is the path gain from UE 101 to serving BS 103. This approach is simpler than the second-strongest path gain of the conventional system. Compared to estimating the second strongest path gain, the UE 101 simply estimates the total received power and signal power. Thus, the sum of path gain to non-serving sectors can be used as a factor to consider interference to other sectors and replace the second strongest path gain.

Also, the sum of path gain to non-serving sectors can be used for other power control schemes, such as, the above mentioned enhanced fractional power control. Such enhanced fractional power control scheme can be expressed as $$PSD = SINR_T + IoT + \text{Noise} - \alpha \cdot g_{servingsector} - (1-\alpha) \times g,$$

where $SINR_T$ is the target signal to interference ratio of an uplink (UL) signal, IoT is interference rise over thermal levels, and Noise is the thermal noise per subcarrier, $\alpha$ is a path loss compensation factor, $g_{servingsector}$ is the path gain to the serving sector, and g is the sum of path gain to non-serving sectors. The processes for power control under the ICPC scheme are now explained.

Figure 3A:
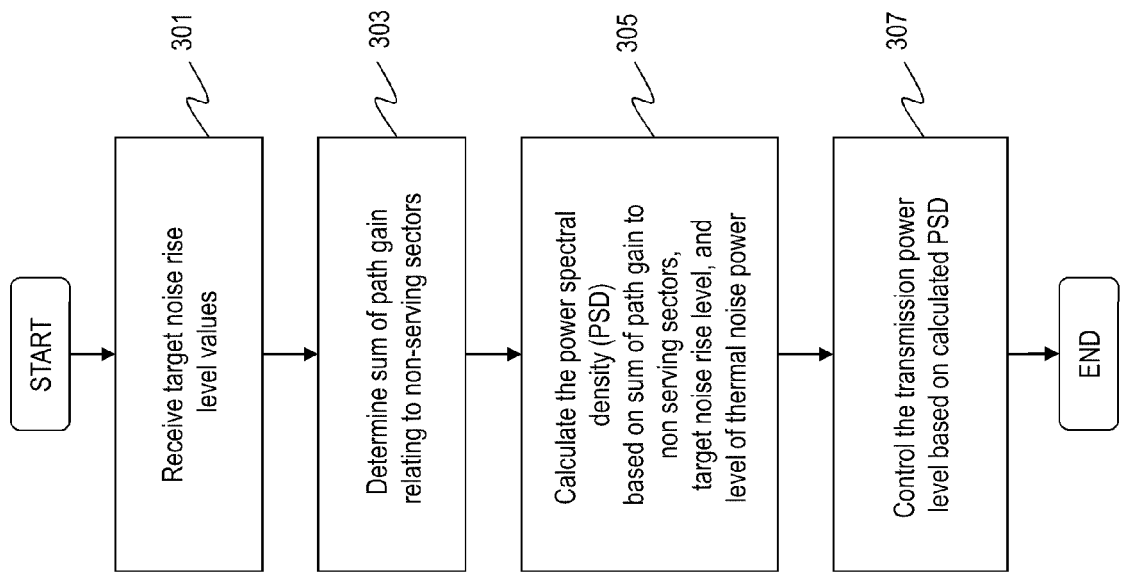

FIGS. 3A and 3B are flowcharts of processes for controlling transmission power based on path gain of non-serving sectors, according to various embodiments of the invention. As mentioned, the ICPC scheme accounts for interference levels introduced by other sectors instead of targeting a certain SINR. In FIG. 3A, the UE 101 receives target noise level (NRT) values from the base station 103, step 301. In an exemplary embodiment, the NRT values are broadcast by the base station 103; alternatively, the base station 101 can also unicast a special value to any UE 101 (considering NRT value are related to the modulation and coding scheme). Exemplary NRT values are as follows:

NRT=[13.0, 4.0, 3.0, 2.0, 1.0, 1.0, 1.0, 0.0, 0.0, 0.0, 0.0].

In step 303, the UE 101 determines the sum of path gain relating to non-serving sectors, as explained with respect to FIG. 2. The process can then determine interference levels of the non-serving sectors by computing the PSD based on the target noise rise level values, the sum of path gain to all non-serving sectors, and level of thermal noise level, per step 305. Upon obtaining the interference information, the transmission power level can be set, per step 307. For instance, the UE 101 can use the NRT[MCS index] for power control. Considering that power control is performed relatively less frequently than adjustment of MCS (Modulation and Coding Scheme), NRT values are utilized for power control:

$$NRT = a*NRT + (1-a)NRT[MCS[n]],$$

where MCS is the value for power control usage, MCS[n] is the actual MCS of this MS in frame n.

According to one embodiment, the MCS index can be determined as follows. A parameter B(m) is defined to be a function of the MCS index m:

$$\beta(n+1) = \mu B(m) + (1-\mu)\beta(n),$$

where $\mu$ is a "forgetting" factor (e.g., $\mu=0.1$).

B(m) can be defined by a table, such as Table 1:

TABLE 1

| MCS Index(m) | MCS | B(m) dB |
|---|---|---|
| 0 | Binary Phase Shift Keying (BPSK) 1/5 | 15 |
| 1 | BPSK 1/3 | 8 |
| 2 | Quadrature Phase Shift Keying (QPSK) 1/4 | 7 |

TABLE 1-continued

| MCS Index(m) | MCS | B(m) dB |
|---|---|---|
| 3 | QPSK 1/3 | 6 |
| 4 | QPSK 1/2 | 5 |
| 5 | QPSK 2/3 | 4 |
| 6 | QPSK 3/4 | 3 |
| 7 | 16QAM (Quadrature Amplitude Modulation) 1/2 | 2 |
| 8 | 16QAM 2/3 | 1 |

B(m) can be configured when the UE 101 setups a connection. By adjusting the parameter B(m), the distribution of user bit rates in the cell can be optimized to the specific radio environment of the cell.

As previously described, the sum of path gain to non-serving sectors (as opposed to the second strongest path gain) permits a more simplified mechanism without sacrificing performance. The computation of the sum path gain to all non-serving sectors is shown in FIG. 3B. Specifically, in step 311, the total power of a received signal is estimated. Next, the noise power associated with the received signal is obtained, as in step 313. In step 315, the transmit power of the base station 103 is determined. Additionally, the process determines path gain to this serving base station 103 (step 317). Thereafter, the sum of path gain to non-serving sectors is computed, as in step 319, based on the total received power, the noise power, and the base station transmit power, as well as path gain to the serving base station 103.

The described "ICPC" mechanism, according to various embodiments, provides a number of benefits. For example, the UE can enjoy significant power savings. Also, intra- and inter-cell power control can be combined in a single, simplified mechanism (e.g., with the need for overload indicators, etc.). Additionally, the system 100 can operate at low noise raise, implying increased predictability of SINR. This improves link adaptation and channel aware scheduling. In certain embodiments, no signaling needed (except for some parameters at connection setup). Further, tradeoff between sector throughput and sector edge user throughput can be fine tuned with the parameters of the algorithm.

Figure 4A:
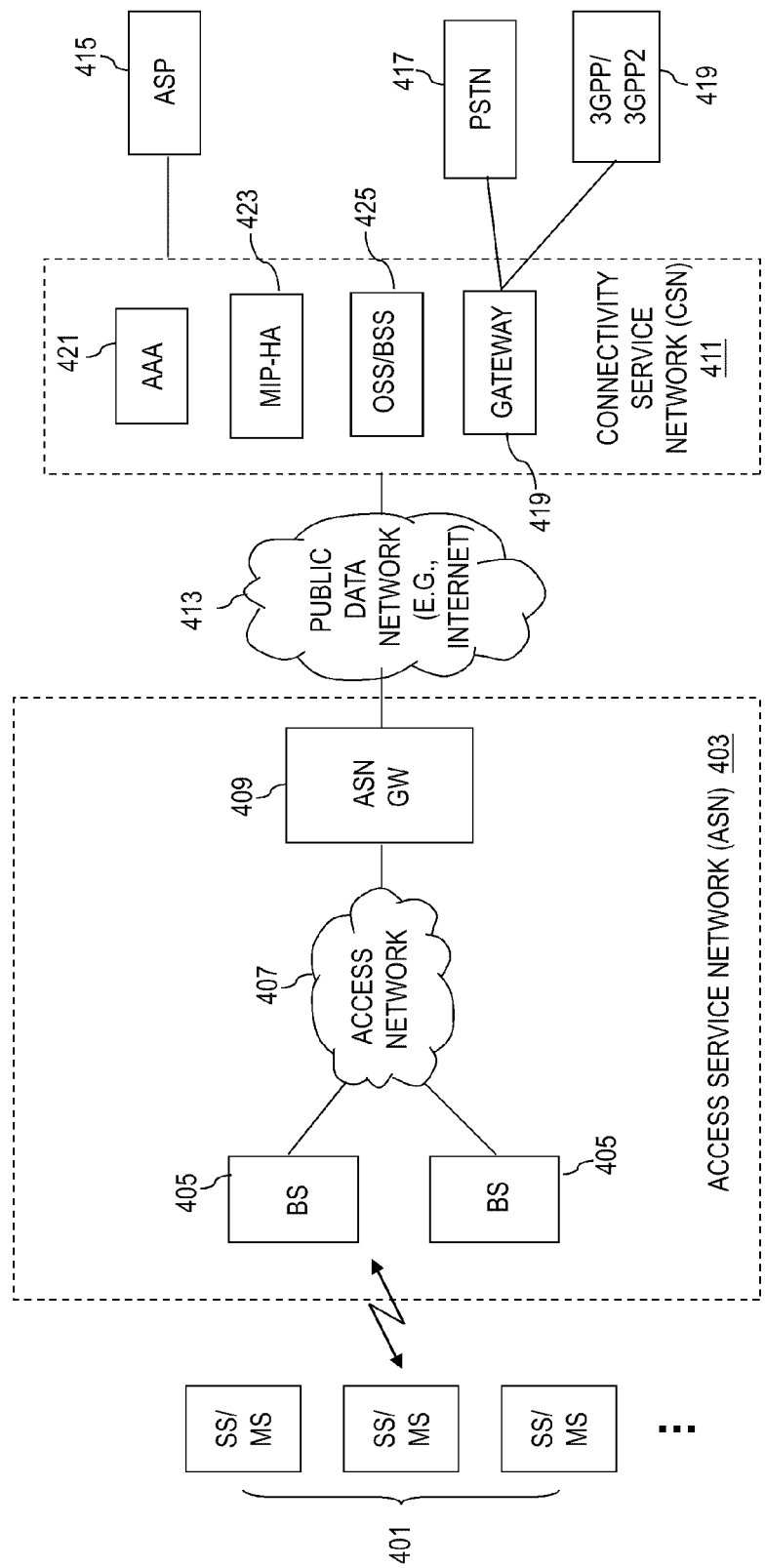
FIGS. 4A and 4B are diagrams of an architecture capable of supporting various embodiments of the invention.
Figure 4B:
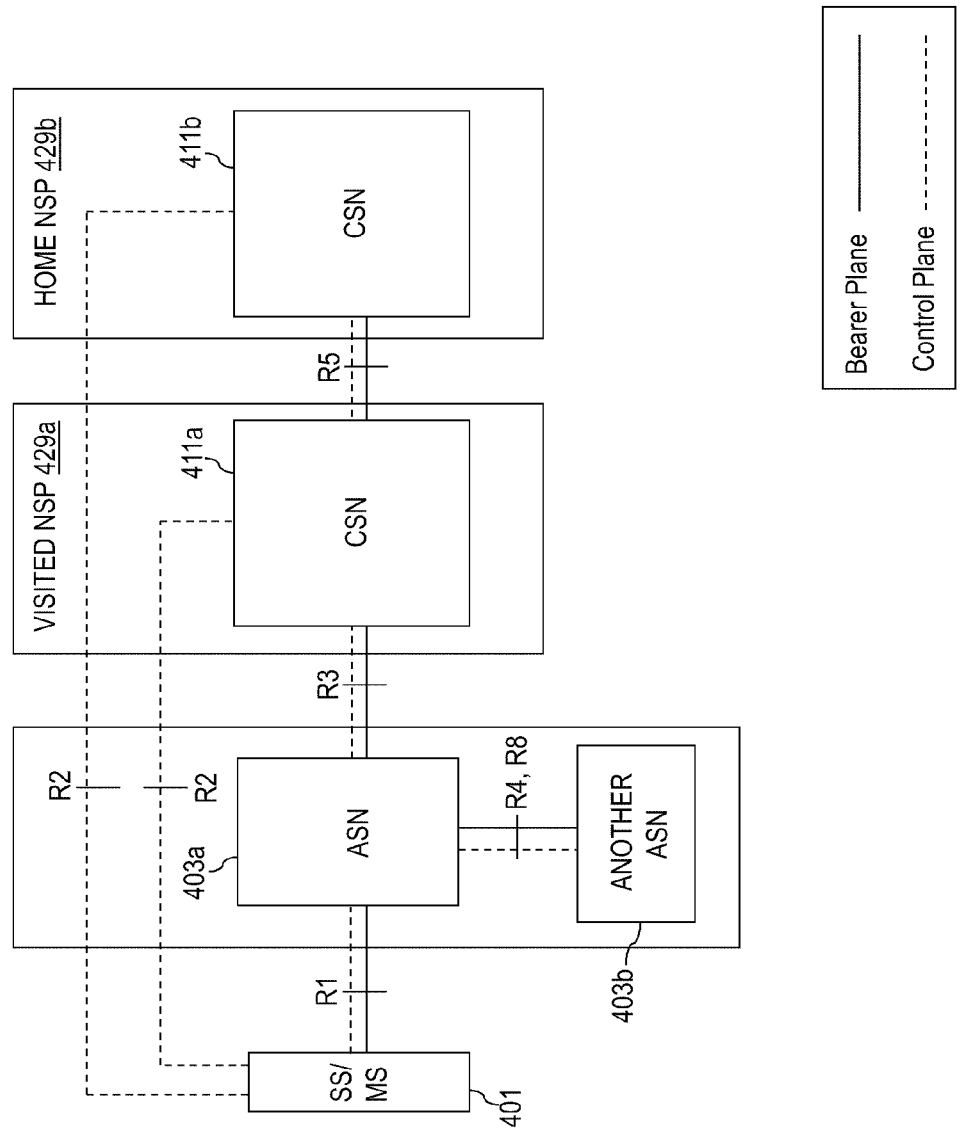

FIGS. 4A and 4B are diagrams of an exemplary WiMAX architecture, in which the system of FIG. 1 can operate, according to various exemplary embodiments of the invention. The architecture shown in FIGS. 4A and 4B can support fixed, nomadic, and mobile deployments and be based on an IP service model.

Subscriber or mobile stations 401 can communicate with an access service network (ASN) 403, which includes one or more base stations 405. In this exemplary system, the BS 103, in addition to providing the air interface to the MS 101, possesses such management functions as handoff triggering and tunnel establishment, radio resource management, quality of service (QoS) policy enforcement, traffic classification, DHCP (Dynamic Host Control Protocol) proxy, key management, session management, and multicast group management.

The base station 405 has connectivity to an access network 407. The access network 407 utilizes an ASN gateway 409 to access a connectivity service network (CSN) 411 over, for example, a data network 413. By way of example, the network 413 can be a public data network, such as the global Internet.

The ASN gateway 409 provides a Layer 2 traffic aggregation point within the ASN 403. The ASN gateway 409 can additionally provide intra-ASN location management and paging, radio resource management and admission control, caching of subscriber profiles and encryption keys, AAA client functionality, establishment and management of mobility tunnel with base stations, QoS and policy enforcement, foreign agent functionality for mobile IP, and routing to the selected CSN 411.

The CSN 411 interfaces with various systems, such as application service provider (ASP) 415, a public switched telephone network (PSTN) 417, and a Third Generation Partnership Project (3GPP) /3GPP2 system 419, and enterprise networks (not shown).

The CSN 411 can include the following components: Access, Authorization and Accounting system (AAA) 421, a mobile IP-Home Agent (MIP-HA) 423, an operation support system (OSS)/business support system (BSS) 425, and a gateway 427. The AAA system 421, which can be implemented as one or more servers, provide support authentication for the devices, users, and specific services. The CSN 411 also provides per user policy management of QoS and security, as well as IP address management, support for roaming between different network service providers (NSPs), location management among ASNs.

FIG. 4B shows a reference architecture that defines interfaces (i.e., reference points) between functional entities capable of supporting various embodiments of the invention. The WiMAX network reference model defines reference points: R1, R2, R3, R4, and R5. R1 is defined between the MS 101 and the ASN 403a; this interface, in addition to the air interface, includes protocols in the management plane. R2 is provided between the MS 101 and an CSN (e.g., CSN 411a and 411b) for authentication, service authorization, IP configuration, and mobility management. The ASN 403a and CSN 411a communicate over R3, which supports policy enforcement and mobility management.

R4 is defined between ASNs 403a and 403b to support inter-ASN mobility. R5 is defined to support roaming across multiple NSPs (e.g., visited NSP 429a and home NSP 429b).

By way of example, the above processes utilize an architecture compliant with the UMTS terrestrial radio access network (UTRAN) or Evolved UTRAN (E-UTRAN) in 3GPP. This architecture is more fully described below with respect to FIGS. 6A-6D.

One of ordinary skill in the art would recognize that the processes for providing frequency reuse may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 5.

Figure 5:
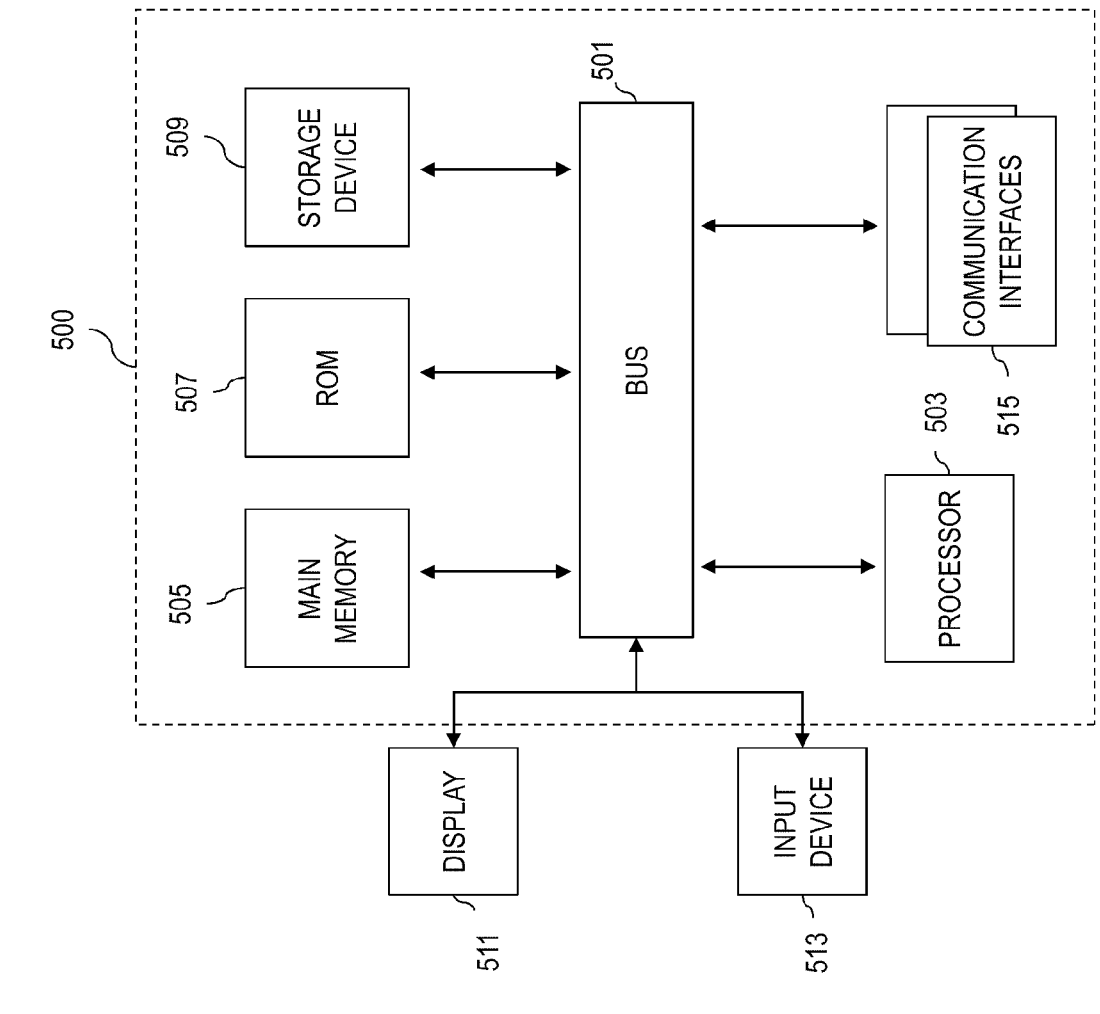
FIG. 5 is a diagram of hardware that can be used to implement an embodiment of the invention.

FIG. 5 illustrates exemplary hardware upon which various embodiments of the invention can be implemented. A computing system 500 includes a bus 501 or other communication mechanism for communicating information and a processor 503 coupled to the bus 501 for processing information. The computing system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computing system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computing system 500 may be coupled with the bus 501 to a display 511, such as a liquid crystal display, or active matrix display, for displaying information to a user. An input device 513, such as a keyboard including alphanumeric and other keys, may be coupled to the bus 501 for communicating information and command selections to the processor 503. The input device 513 can include a cursor control, such as a mouse, a trackball, or cursor direction keys, for communicating direction information and command selections to the processor 503 and for controlling cursor movement on the display 511.

According to various embodiments of the invention, the processes described herein can be provided by the computing system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 500 also includes at least one communication interface 515 coupled to bus 501. The communication interface 515 provides a two-way data communication coupling to a network link (not shown). The communication interface 515 sends and receives electrical, electromagnetic, or optical signals that carry digital data streams representing various types of information. Further, the communication interface 515 can include peripheral interface devices, such as a Universal Serial Bus (USB) interface, a PCMCIA (Personal Computer Memory Card International Association) interface, etc.

The processor 503 may execute the transmitted code while being received and/or store the code in the storage device 509, or other non-volatile storage for later execution. In this manner, the computing system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIGS. 6A-6D are diagrams of communication systems having exemplary long-term evolution (LTE) architectures, in which the user equipment (UE) and the base station of FIG. 1 can operate, according to various exemplary embodiments of the invention. By way of example (shown in FIG. 6A), a base station (e.g., destination node 103) and a user equipment (UE) (e.g., source node 101) can communicate in system 600 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

The communication system 600 is compliant with 3GPP LTE, entitled "Long Term Evolution of the 3GPP Radio Technology" (which is incorporated herein by reference in its entirety). As shown in FIG. 6A, one or more user equipment (UEs) 101 communicate with a network equipment, such as a base station 103, which is part of an access network (e.g., WiMAX (Worldwide Interoperability for Microwave Access), 3GPP LTE (or E-UTRAN or 8.9G), etc.). Under the 3GPP LTE architecture, base station 103 is denoted as an enhanced Node B (eNB).

MME (Mobile Management Entity)/Serving Gateways 601 are connected to the eNBs 103 in a full or partial mesh configuration using tunneling over a packet transport network (e.g., Internet Protocol (IP) network) 603. Exemplary functions of the MME/Serving GW 601 include distribution of paging messages to the eNBs 103, termination of U-plane packets for paging reasons, and switching of U-plane for support of UE mobility. Since the GWs 601 serve as a gateway to external networks, e.g., the Internet or private networks 603, the GWs 601 include an Access, Authorization and Accounting system (AAA) 605 to securely determine the identity and privileges of a user and to track each user's activities. Namely, the MME Serving Gateway 601 is the key control-node for the LTE access-network and is responsible for idle mode UE tracking and paging procedure including retransmissions. Also, the MME 601 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 6B:
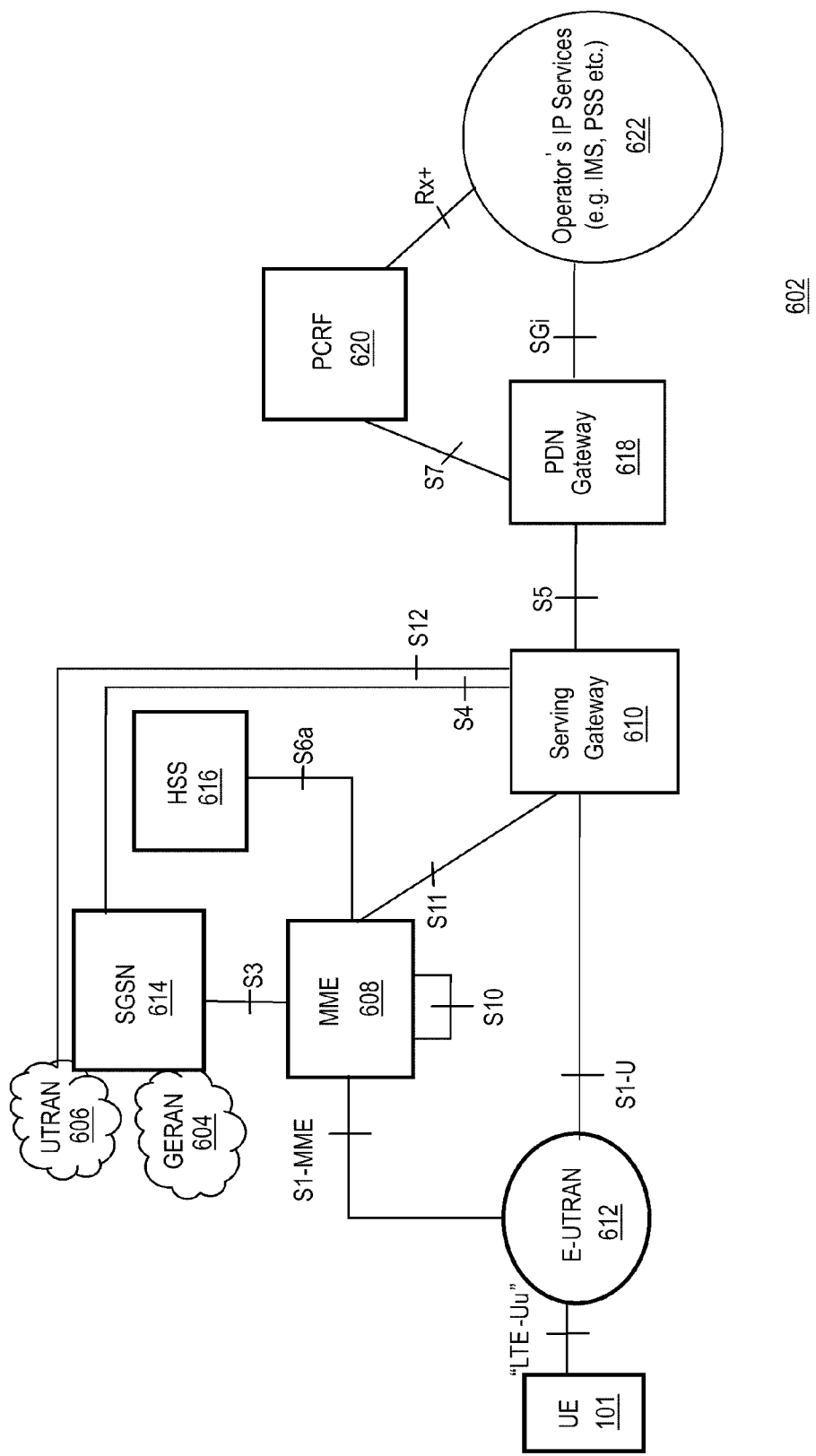

In FIG. 6B, a communication system 602 supports GERAN (GSM/EDGE radio access) 604, and UTRAN 606 based access networks, E-UTRAN 612 and non-3GPP (not shown) based access networks, and is more fully described in TR 23.882, which is incorporated herein by reference in its entirety. A key feature of this system is the separation of the network entity that performs control-plane functionality (MME 608) from the network entity that performs bearer-plane functionality (Serving Gateway 610) with a well defined open interface between them S11. Since E-UTRAN 612 provides higher bandwidths to enable new services as well as to improve existing ones, separation of MME 608 from Serving Gateway 610 implies that Serving Gateway 610 can be based on a platform optimized for signaling transactions. This scheme enables selection of more cost-effective platforms for, as well as independent scaling of, each of these two elements. Service providers can also select optimized topological locations of Serving Gateways 610 within the network independent of the locations of MMEs 608 in order to reduce optimized bandwidth latencies and avoid concentrated points of failure.

As seen in FIG. 6B, the E-UTRAN (e.g., eNB) 612 interfaces with UE 101 via LTE-Uu. The E-UTRAN 612 supports LTE air interface and includes functions for radio resource control (RRC) functionality corresponding to the control plane MME 608. The E-UTRAN 612 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 608, as a key control node, is responsible for managing mobility UE identifies and security parameters and paging procedure including retransmissions. The MME 608 is involved in the bearer activation/deactivation process and is also responsible for choosing Serving Gateway 610 for the UE 101. MME 608 functions include Non Access Stratum (NAS) signaling and related security. MME 608 checks the authorization of the UE 101 to camp on the service provider's Public Land Mobile Network (PLMN) and enforces UE 101 roaming restrictions. The MME 608 also provides the control plane function for mobility between LTE and 2G/3G access networks with the S3 interface terminating at the MME 608 from the SGSN (Serving GPRS Support Node) 614.

The SGSN 614 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 608 and HSS (Home Subscriber Server) 616. The S10 interface between MMEs 608 provides MME relocation and MME 608 to MME 608 information transfer. The Serving Gateway 610 is the node that terminates the interface towards the E-UTRAN 612 via S1-U.

The S1-U interface provides a per bearer user plane tunneling between the E-UTRAN 612 and Serving Gateway 610. It contains support for path switching during handover between eNBs 103. The S4 interface provides the user plane with related control and mobility support between SGSN 614 and the 3GPP Anchor function of Serving Gateway 610.

The S12 is an interface between UTRAN 606 and Serving Gateway 610. Packet Data Network (PDN) Gateway 618 provides connectivity to the UE 101 to external packet data networks by being the point of exit and entry of traffic for the UE 101. The PDN Gateway 618 performs policy enforcement, packet filtering for each user, charging support, lawful interception and packet screening. Another role of the PDN Gateway 618 is to act as the anchor for mobility between 3GPP and non-3GPP technologies such as WiMax and 3GPP2 (CDMA 1x and EvDO (Evolution Data Only)).

The S7 interface provides transfer of QoS policy and charging rules from PCRF (Policy and Charging Role Function) 620 to Policy and Charging Enforcement Function (PCEF) in the PDN Gateway 618. The SGi interface is the interface between the PDN Gateway and the operator's IP services including packet data network 622. Packet data network 622 may be an operator external public or private packet data network or an intra operator packet data network, e.g., for provision of IMS (IP Multimedia Subsystem) services. Rx+is the interface between the PCRF and the packet data network 622.

Figure 6C:
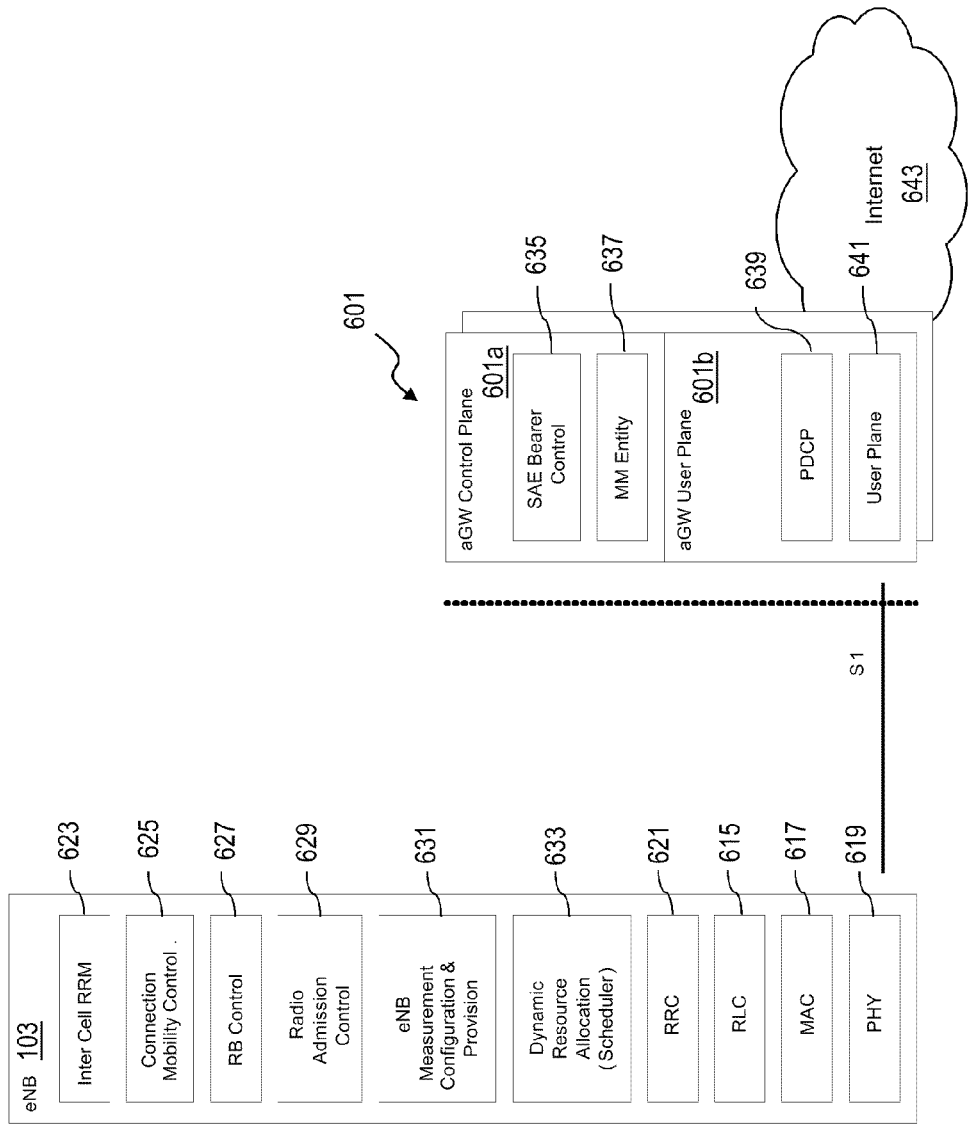

As seen in FIG. 6C, the eNB 103 utilizes an E-UTRA (Evolved Universal Terrestrial Radio Access) (user plane, e.g., RLC (Radio Link Control) 615, MAC (Media Access Control) 617, and PHY (Physical) 619, as well as a control plane (e.g., RRC 621)). The eNB 103 also includes the following functions: Inter Cell RRM (Radio Resource Management) 623, Connection Mobility Control 625, RB (Radio Bearer) Control 627, Radio Admission Control 629, eNB Measurement Configuration and Provision 631, and Dynamic Resource Allocation (Scheduler) 633.

The eNB 103 communicates with the aGW 601 (Access Gateway) via an S1 interface. The aGW 601 includes a User Plane 601*a* and a Control plane 601*b*. The control plane 601*b* provides the following components: SAE (System Architecture Evolution) Bearer Control 635 and MM (Mobile Management) Entity 637. The user plane 601*b* includes a PDCP (Packet Data Convergence Protocol) 639 and a user plane functions 641. It is noted that the functionality of the aGW 601 can also be provided by a combination of a serving gateway (SGW) and a packet data network (PDN) GW. The aGW 601 can also interface with a packet network, such as the Internet 643.

Figure 6D:
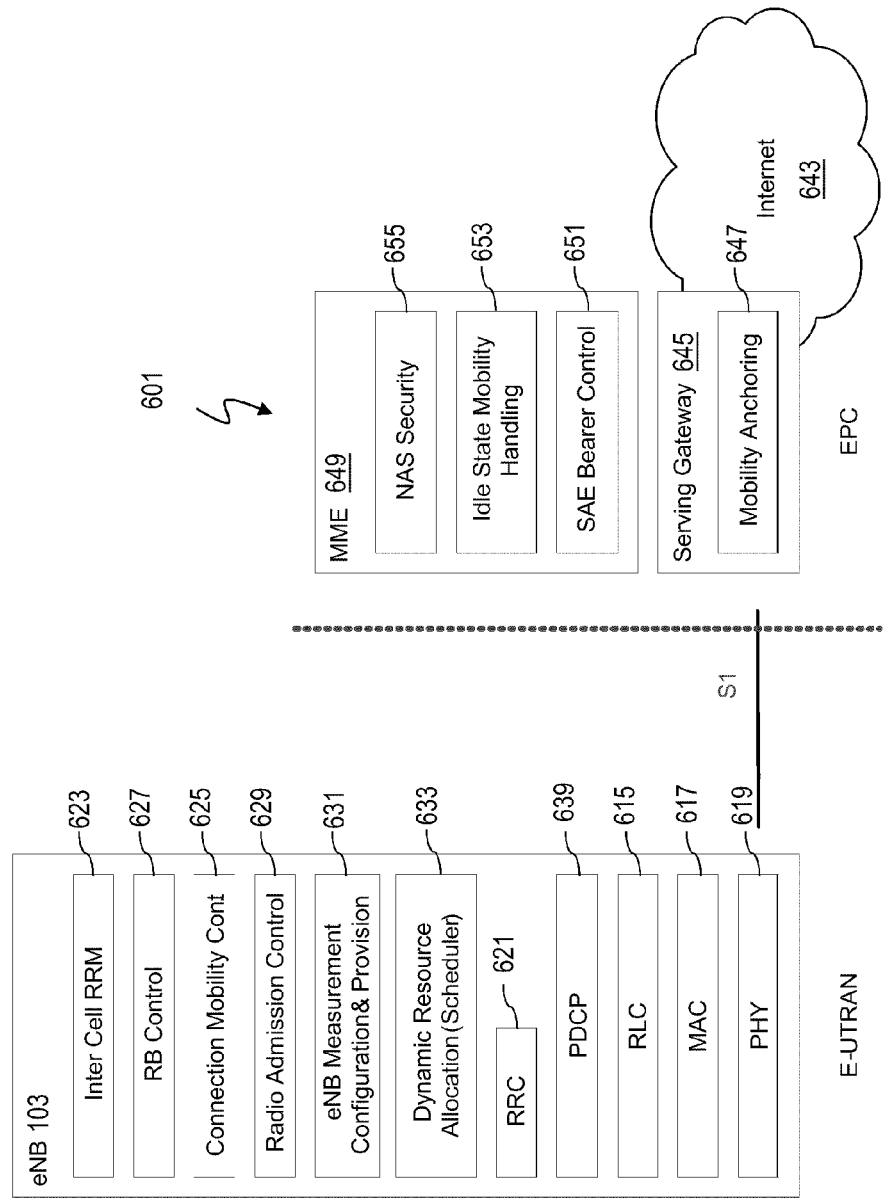

In an alternative embodiment, as shown in FIG. 6D, the PDCP (Packet Data Convergence Protocol) functionality can reside in the eNB 103 rather than the GW 601. Other than this PDCP capability, the eNB functions of FIG. 6C are also provided in this architecture.

In the system of FIG. 6D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 103 interfaces via the S1 to the Serving Gateway 645, which includes a Mobility Anchoring function 647. According to this architecture, the MME (Mobility Management Entity) 649 provides SAE (System Architecture Evolution) Bearer Control 651, Idle State Mobility Handling 653, and NAS (Non-Access Stratum) Security 655.

Figure 7:
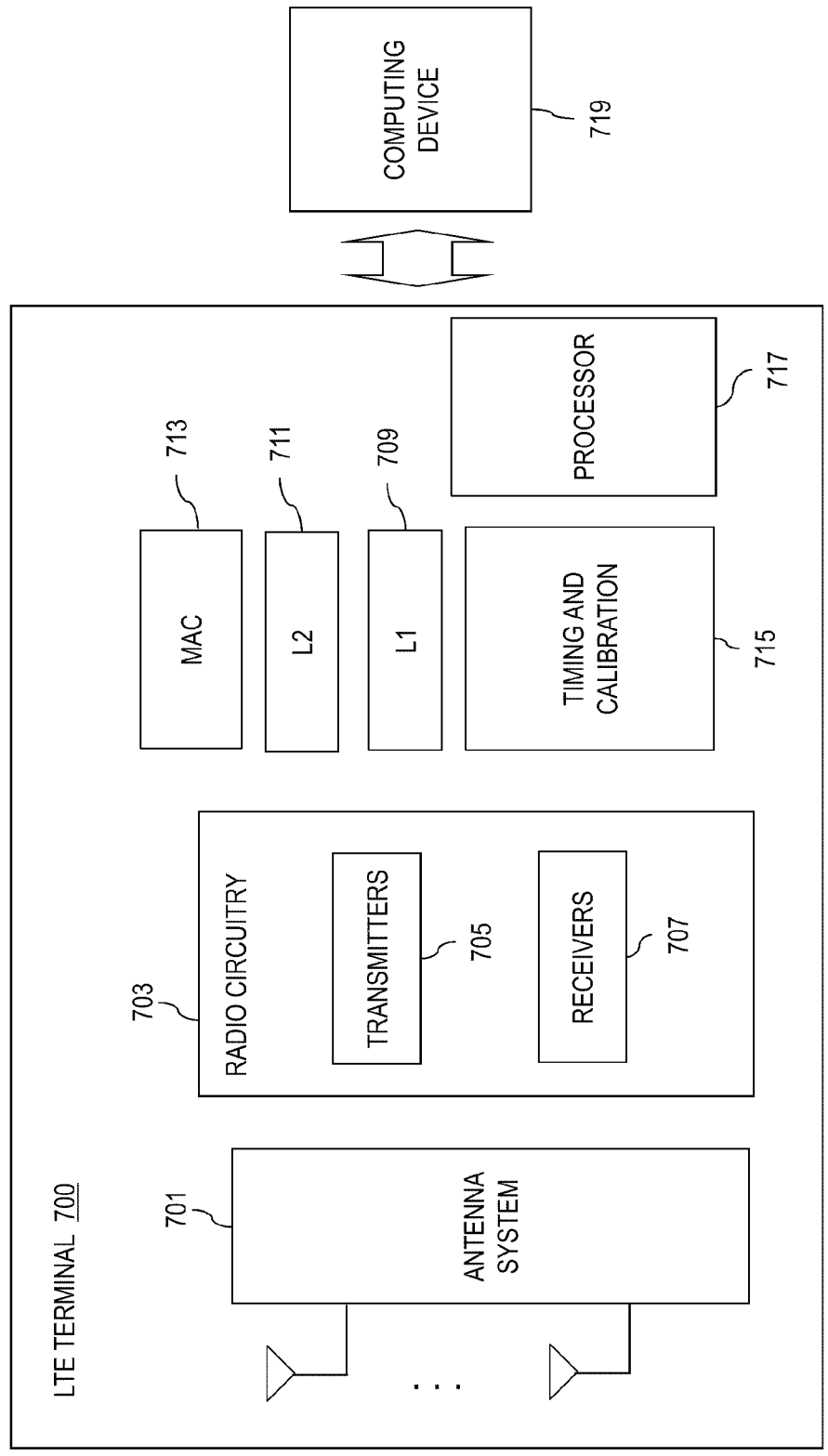
FIG. 7 is a diagram of exemplary components of an LTE terminal capable of operating in the systems of FIGS. 6A-6D, according to an embodiment of the invention.

FIG. 7 is a diagram of exemplary components of an LTE terminal capable of operating in the systems of FIGS. 6A-6D, according to an embodiment of the invention. An LTE terminal 700 is configured to operate in a Multiple Input Multiple Output (MIMO) system. Consequently, an antenna system 701 provides for multiple antennas to receive and transmit signals. The antenna system 701 is coupled to radio circuitry 703, which includes multiple transmitters 705 and receivers 707. The radio circuitry encompasses all of the Radio Frequency (RF) circuitry as well as base-band processing circuitry. As shown, layer-1 (L1) and layer-2 (L2) processing are provided by units 709 and 711, respectively. Optionally, layer-3 functions can be provided (not shown). Module 713 executes all MAC layer functions. A timing and calibration module 715 maintains proper timing by interfacing, for example, an external timing reference (not shown). Additionally, a processor 717 is included. Under this scenario, the LTE terminal 700 communicates with a computing device 719, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving target noise rise level values;
   determining sum of path gain relating to non-serving sectors;
   computing a power spectrum density (PSD) based on the target noise rise level values, the sum of path gain, and level of thermal noise power; and
   setting a power level based on the computed power spectrum density.

2. A method according to claim 1, wherein the target noise rise level values are received from a base station over either a broadcast channel or a unicast channel, and the power level corresponds to a user equipment.

3. A method according to claim 1, further comprising:
   estimating total received power of a received signal; and
   determining noise power associated with the received signal,
   wherein the sum of path gain is determined based on the total received power, the noise power, and path gain to a serving base station.

4. A method according to claim 1, further comprising:
   transmitting, at the set power level, a signal over a radio network that complies with a long term evolution (LTE)-compliant architecture.

5. A method according to claim 1, further comprising:
   inputting the determined sum of path gain into a power control scheme to output the power spectral density.

6. A method according to claim 5, wherein the power control scheme is computed according to:

$$PSD = SINR_T + IoT + \text{Noise} - \alpha \cdot g_{servingsector} - (1-\alpha) \times g,$$

where $SINR_T$ is a target signal to interference ratio of an uplink (UL) signal, IoT is interference rise over thermal levels, and Noise is the thermal noise per subcarrier, $\alpha$ is a path loss compensation factor, $g_{servingsector}$ is the path gain to the serving sector, and g is the sum of path gain.

7. An apparatus comprising:
   a power control module configured to receive target noise rise level values, and to determine sum of path gain to non-serving sectors,
   wherein the power control module is further configured to compute a power spectrum density (PSD) based on the target noise rise level values, the sum of path gain, and level of thermal noise power, the power control module being further configured to set a power level based on the computed power spectrum density.

8. An apparatus according to claim 7, wherein the target noise rise level values are received from a base station over either a broadcast channel or a unicast channel, and the power level corresponds to a user equipment.

9. An apparatus according to claim 7, wherein the power control module is further configured to estimate total received power of a received signal, determine noise power associated with the received signal, wherein the sum of path gain is determined based on the total received power, the noise power, and path gain to a serving base station.

10. An apparatus according to claim 7, further comprising:
a transceiver configured to transmit, at the set power level, a signal over a radio network that complies with a long term evolution (LTE)-compliant architecture.

11. An apparatus according to claim 7, wherein the power control module is further configured to input the determined sum of path gain into a power control scheme to output the power spectral density.

12. An apparatus according to claim 11, wherein the power control scheme is computed according to:

$$PSD = SINR_T + IoT + \text{Noise} - \alpha \cdot g_{servingsector} - (1-\alpha) \times g,$$

where $SINR_T$ is a target signal to interference ratio of an uplink (UL) signal, IoT is interference rise over thermal levels, and Noise is the thermal noise per subcarrier, a is a path loss compensation factor, $g_{servingsector}$ is the path gain to the serving sector, and g is the sum of path gain.

13. A method comprising:
generating target noise rise level values for transmission to a terminal for adjustment of power level,
wherein the power level is adjusted by computing a power spectrum density (PSD) of the terminal based on the target noise rise level values, a sum of path gain to non-serving sectors, and level of thermal noise power.

14. A method according to claim 13, wherein the target noise rise level values are transmitted over either a broadcast channel or a unicast channel.

15. A method according to claim 13, wherein the sum of path gain is determined based on a total received power, noise power, and path gain to a serving base station.

16. A method according to claim 15, wherein the serving base station complies with a long term evolution (LTE)-compliant architecture.

17. An apparatus comprising:
a power control module configured to generate target noise rise level values for transmission to a terminal for adjustment of power level,
wherein the power level is adjusted by computing a power spectrum density (PSD) of the terminal based on the target noise rise level values, a sum of path gain to non-serving sectors, and level of thermal noise power.

18. An apparatus according to claim 17, wherein the target noise rise level values are transmitted over either a broadcast channel or a unicast channel.

19. An apparatus according to claim 17, wherein the sum of path gain to non-serving sectors is determined based on a total received power, noise power, and path gain to a serving base station.

20. An apparatus according to claim 19, wherein the serving base station complies with a long term evolution (LTE)-compliant architecture.

* * * * *